United States Patent
Singh et al.

(10) Patent No.: US 11,126,235 B2
(45) Date of Patent: Sep. 21, 2021

(54) DETECTION OF TRANSMISSION MEDIUM STATE FOR POWER DELIVERY

(71) Applicant: Intel Corporation, Santa Clara, CA (US)

(72) Inventors: Jagadish Vasudeva Singh, Bangalore (IN); Tarakesava Reddy Koki, Bangalore (IN); Arvind Sundaram, Bangalore (IN); Vinaya Kumar Chandrasekhara, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 455 days.

(21) Appl. No.: 15/927,849

(22) Filed: Mar. 21, 2018

(65) Prior Publication Data
US 2019/0294223 A1    Sep. 26, 2019

(51) Int. Cl.
G06F 1/26 (2006.01)
G06F 1/32 (2019.01)
G06F 1/16 (2006.01)
G06F 1/3212 (2019.01)

(52) U.S. Cl.
CPC ............. *G06F 1/26* (2013.01); *G06F 1/1683* (2013.01); *G06F 1/3212* (2013.01)

(58) Field of Classification Search
CPC .................................... G06F 1/32; G06F 1/26
See application file for complete search history.

(56) References Cited

U.S. PATENT DOCUMENTS

| | | | |
|---|---|---|---|
| 6,288,522 B1 | 9/2001 | Odaohhara et al. | |
| 7,733,060 B2 | 6/2010 | Kojima | |
| 9,871,403 B2 | 1/2018 | Sotani et al. | |
| 10,044,204 B2* | 8/2018 | Hu | H02J 7/022 |
| 2004/0246341 A1* | 12/2004 | Lee | H02J 7/342 348/207.99 |
| 2006/0172763 A1* | 8/2006 | Sunda | H02J 7/0029 455/550.1 |
| 2008/0254684 A1 | 10/2008 | Tracy et al. | |
| 2008/0320320 A1* | 12/2008 | Li | G06F 1/26 713/300 |
| 2009/0174366 A1 | 7/2009 | Ahmad et al. | |
| 2013/0138373 A1* | 5/2013 | Lee | G01R 31/3832 702/65 |
| 2016/0233780 A1* | 8/2016 | Choi | G06F 30/20 |
| 2017/0115719 A1* | 4/2017 | Hunter, Jr. | G06F 1/28 |
| 2017/0222544 A1* | 8/2017 | Kuo | H02M 1/32 |

(Continued)

OTHER PUBLICATIONS

Final Office Action dated Feb. 19, 2020 for U.S. Appl. No. 15/937,603.

(Continued)

*Primary Examiner* — Phil K Nguyen
(74) *Attorney, Agent, or Firm* — Schwabe, Williamson & Wyatt, P.C.

(57) ABSTRACT

A first apparatus is disclosed, including: a detection circuitry to detect a first voltage level of reference current received from a second apparatus, where the second apparatus is to provide the reference current at a second voltage level; and a controller to negotiate a power transmission agreement with the second apparatus for transmission of power from the second apparatus to the first apparatus, based at least in part on a difference between the first voltage level and the second voltage level.

19 Claims, 7 Drawing Sheets

(56) References Cited

U.S. PATENT DOCUMENTS

2018/0074574 A1* 3/2018 Camiolo ............... G06F 1/3296
2018/0083480 A1* 3/2018 Burton .................. B60J 3/0278
2018/0088648 A1* 3/2018 Otani ..................... H04L 69/08
2018/0254648 A1* 9/2018 Harju ....................... H02J 7/00
2019/0025897 A1* 1/2019 Atkinson ............ G06F 11/3027

OTHER PUBLICATIONS

Non-Final Office Action dated Nov. 5, 2019 for U.S. Appl. No. 15/937,603.
Notice of Allowance dated Apr. 24, 2020 for U.S. Appl. No. 15/937,603.

* cited by examiner

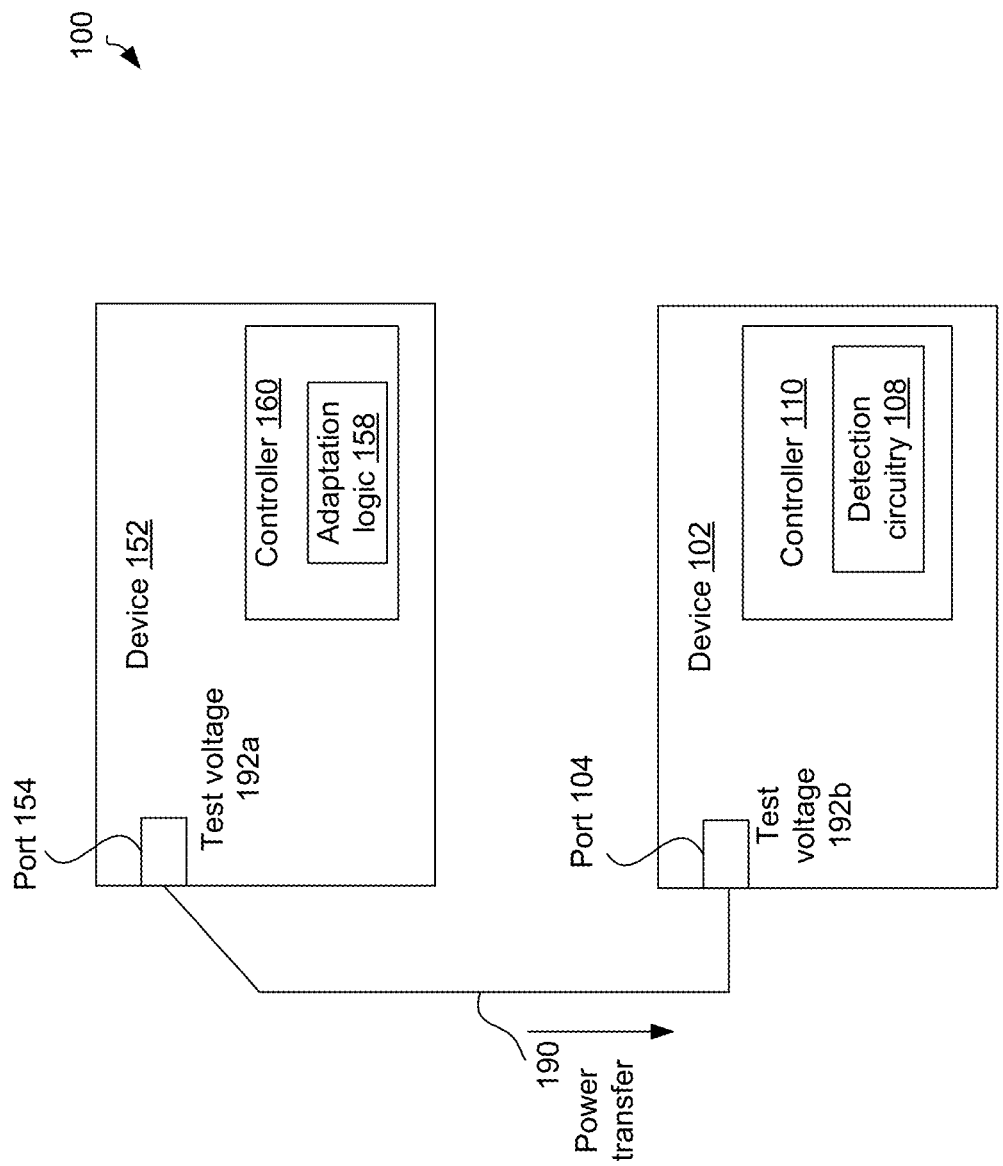

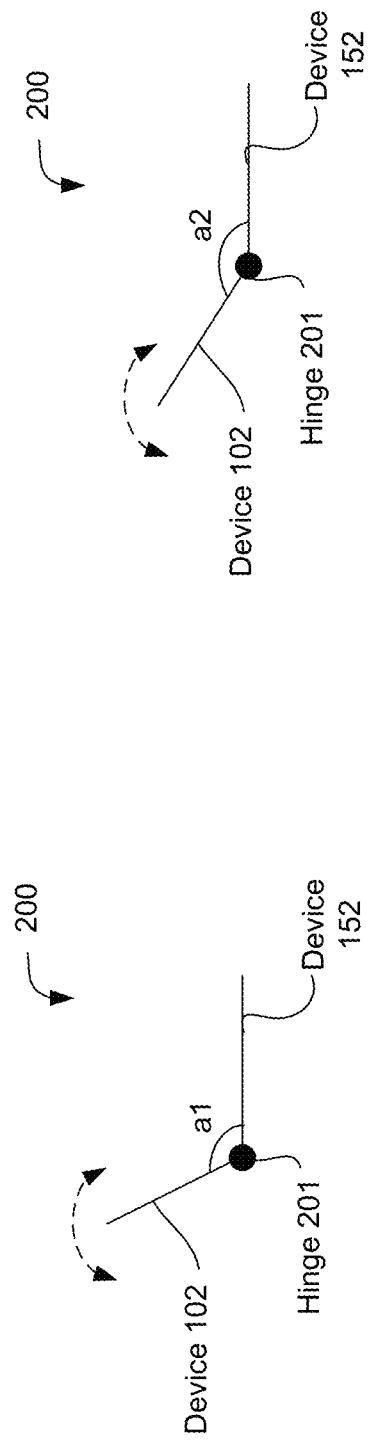

DETECTION OF TRANSMISSION MEDIUM STATE FOR POWER DELIVERY

BACKGROUND

Power may be delivered from a provider device to a consumer device over a communication link, such as a Universal Serial Bus (USB) link. The provider device may be a wall adapter, an Alternating Current (AC) adapter, a Type C adapter (e.g., an adapter employing USB-C techniques), a battery-operated computing device engaged in communication with the consumer device, etc.

A USB compliant adapter (e.g., a Type C adapter) and/or a USB cable may be non-compliant, e.g., may not be able to deliver power specified in its rating. For example, a USB cable may be faulty, may have higher resistance than expected, etc. In another example, a connection between the USB cable and the USB port may have high resistance, e.g., due to corrosion or oxidation in the port or the cable contacts, lint or other debris in the port or the cable contacts, loose fitting of the cable within the port, etc. Such issues may result in reduced power transfer due to, for example, higher loss in the medium, damage to the cable, reduced charging rate, unsatisfactory consumer experience, etc.

BRIEF DESCRIPTION OF THE DRAWINGS

The embodiments of the disclosure will be understood more fully from the detailed description given below and from the accompanying drawings of various embodiments of the disclosure, which, however, should not be taken to limit the disclosure to the specific embodiments, but are for explanation and understanding only.

FIG. 1 schematically illustrates a system comprising a power provider device and a power consumer device, where a voltage and/or a current of power supplied from the power provider device to the power consumer device may be adaptively updated based on an estimation of resistance of a power transmission medium between the two devices, according to some embodiments.

FIGS. 2B-2C respectively represent two example positions of a power consumer device with respect to a power provider device, when the two devices are arranged as the CMD of FIG. 2A, according to some embodiments.

DETAILED DESCRIPTION

Figure 2A:
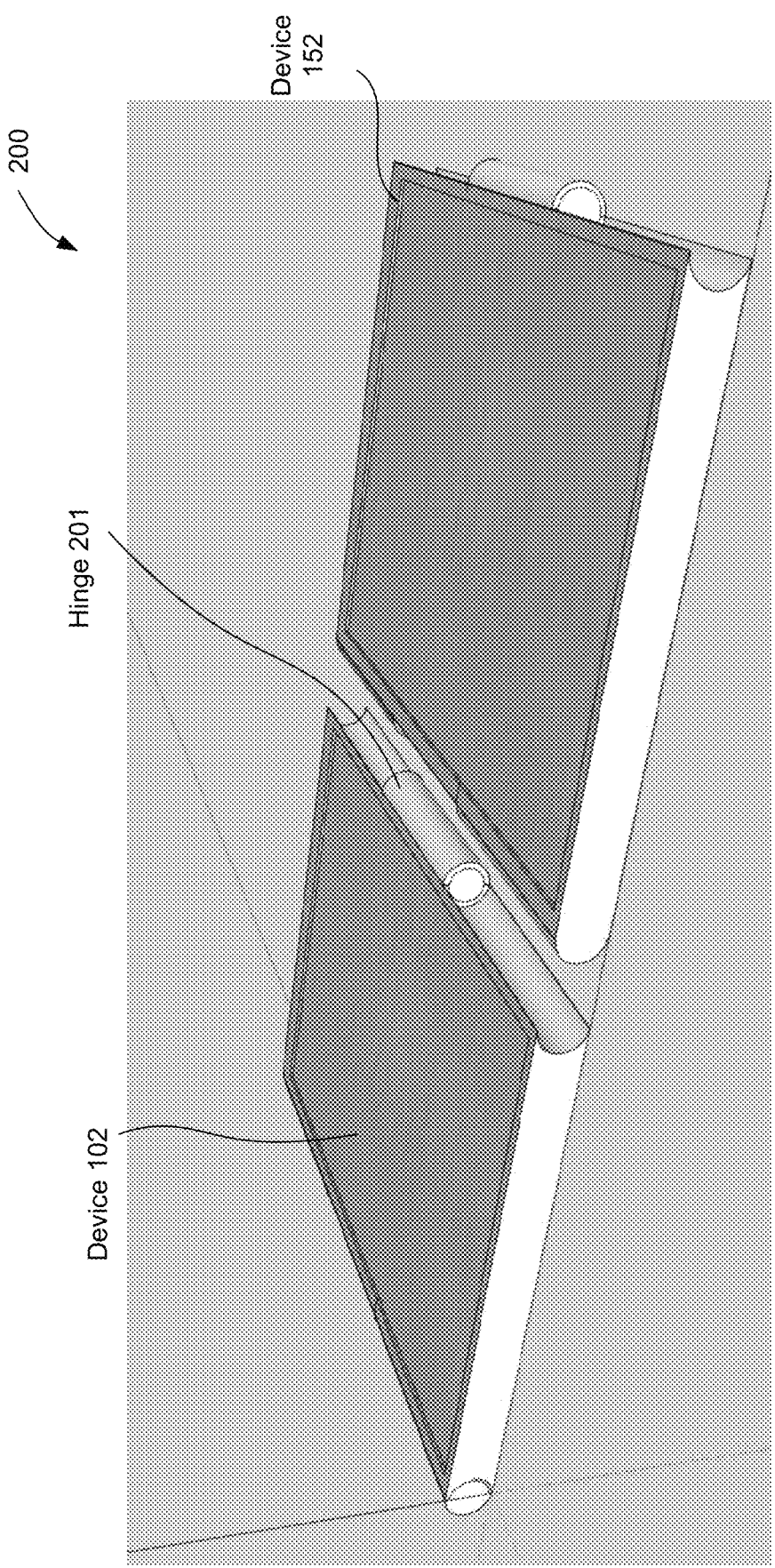
FIG. 2A illustrates a combined device (e.g., a Converged Mobility Device (CMD)) comprising the devices of FIG. 1, according to some embodiments.

In some embodiments, when two devices (e.g., two USB devices) are attached (e.g., via a USB link, via a hinge, etc., as discussed herein later), power may be transmitted from a power provider device to a power consumer device (although the role of the provider and consumer may be interchangeable). Such transmission of power may be in accordance with the USB power delivery protocol (e.g., USB Type-C Power Delivery (PD) specification), or another appropriate power delivery negotiation protocol.

Often times, the delivery of power may be affected by poor condition of the power transmission medium between the two devices, e.g., damage to the cable, oxidation, corrosion, wear and tear, substandard design, accumulation of lint or debris on the cable contacts, etc., which may lead to decreased power delivery, increased charging time, heating, potential fire hazard, decreased user satisfaction, etc. To alleviate such scenarios, in some embodiments, power delivery may be intelligently adapted, based at least in part on the state of the power transmission medium between the two devices.

For example, during a test phase, the power consumer device may request for a known reference current at a first voltage (e.g., as measured at the power provider device end). The power provide device may provide the reference current to the power consumer device. The power consumer device may receive the reference current at a second voltage (e.g., as measured at the power consumer device end). A difference between the first and second voltages may be an indication of an impedance (e.g., resistance) of the power transmission medium. The power delivery from the power provider device to the power consumer device may be adjusted based on the difference between the first and second voltages, and/or based on an estimation of the resistance of the power transmission medium (e.g., by basic Ohm's law).

In another example (and in a reversal of control), during the test phase, the power provider device may request the power consumer device to sync a known reference current. The power provider device may be already aware of the voltage measured at its end. The power consumer device may report second voltage when drawing the reference current. A difference between the first and second voltages may be an indication of a resistance of the power transmission medium. The power delivery from the power provider device to the power consumer device may be adjusted based on the difference between the first and second voltages, and/or based on an estimation of the resistance of the power transmission medium (e.g., by basic Ohm's law).

Such adaptation of the power delivery, based on estimating a state of the power transmission medium, may alleviate the above discussed scenario that may possibly arise due to poor condition of the power transmission medium. For example, if the power transmission medium is in a relatively good state (e.g., negligible or low resistance), more power can be delivered, and vice versa. Other technical effects will be evident from the various embodiments and figures.

In the following description, numerous details are discussed to provide a more thorough explanation of embodiments of the present disclosure. It will be apparent, however, to one skilled in the art, that embodiments of the present disclosure may be practiced without these specific details. In other instances, well-known structures and devices are shown in block diagram form, rather than in detail, in order to avoid obscuring embodiments of the present disclosure.

Note that in the corresponding drawings of the embodiments, signals are represented with lines. Some lines may be thicker, to indicate more constituent signal paths, and/or have arrows at one or more ends, to indicate primary information flow direction. Such indications are not intended to be limiting. Rather, the lines are used in connection with one or more exemplary embodiments to facilitate easier understanding of a circuit or a logical unit. Any represented signal, as dictated by design-needs or preferences, may actually comprise one or more signals that may travel in either direction and may be implemented with any suitable type of signal scheme.

Throughout the specification, and in the claims, the term "connected" means a direct connection, such as electrical, mechanical, or magnetic connection between the things that are connected, without any intermediary devices. The term "coupled" means a direct or indirect connection, such as a direct electrical, mechanical, or magnetic connection between the things that are connected or an indirect connection, through one or more passive or active intermediary devices. The term "circuit" or "module" may refer to one or more passive and/or active components that are arranged to cooperate with one another to provide a desired function. The term "signal" may refer to at least one current signal, voltage signal, magnetic signal, or data/clock signal. The meaning of "a," "an," and "the" include plural references. The meaning of "in" includes "in" and "on." The terms "substantially," "close," "approximately," "near," and "about," generally refer to being within +/−10% of a target value.

Unless otherwise specified the use of the ordinal adjectives "first," "second," and "third," etc., to describe a common object, merely indicate that different instances of like objects are being referred to, and are not intended to imply that the objects so described must be in a given sequence, either temporally, spatially, in ranking or in any other manner.

For the purposes of the present disclosure, phrases "A and/or B" and "A or B" mean (A), (B), or (A and B). For the purposes of the present disclosure, the phrase "A, B, and/or C" means (A), (B), (C), (A and B), (A and C), (B and C), or (A, B and C). The terms "left," "right," "front," "back," "top," "bottom," "over," "under," and the like in the description and in the claims, if any, are used for descriptive purposes and not necessarily for describing permanent relative positions.

FIG. 1 schematically illustrates a system comprising a power provider device 152 and a power consumer device 102, where a voltage and/or a current of the power supplied from the power provider device 152 (also referred to as device 152) to the power consumer device 102 (also referred to as device 102) may be adaptively updated based on an estimated resistance of a power transmission medium between the two devices 102, 152, according to some embodiments.

The device 102 comprises an input/output (I/O) and power port 104 (also referred to as port 104), and the device 152 comprises an I/O and power port 154 (also referred to as port 154). In an example, one or both the ports 104, 154 may be a USB Port, e.g., a USB type-C port (also referred to as USB-C port). In another example, the port 102 may be another appropriate type of USB port. In yet another example, the port 102 may be another appropriate type of port, e.g., a port that that allows flow of power (e.g., in addition to, or instead of, flow of data) between the device 102 and the device 152. For example, when the device 152 is coupled to the device 102 via the port 104, the devices 102 and 152 may transmit data and/or power among themselves. In some embodiments, the ports 104, 154 may be coupled using a communication and power link 190 (also referred to as link 190).

Although the device 152 is referred to as a "power provider" device and the device 102 is referred to as a "power consumer" device, the role of power provider and power consumer may be interchangeable. For example, USB communication allows transmission of power from the device 152 to the device 102, and/or from the device 102 to the device 152, e.g., based on a power requirement and power availability in the two devices, power negotiations among the two devices, etc. However, for ease of discussion and for purposes of this disclosure, unless otherwise mentioned, power is assumed to flow from the device 152 to the device 102.

In some embodiments, the device 102 may be an appropriate computing device, e.g., a laptop, a mobile device, a smart phone, a display device, a tablet, a phablet, a handheld consumer electronic device, a wearable device, an Internet of Things (IoT) device, or the like. The device 152 may be an AC adapter, a Type C adapter, a laptop, a mobile device, a smart phone, a display device, a tablet, a phablet, a handheld consumer electronic device, a wearable device, an IoT device, or the like.

In some embodiments, the device 152 may be attached to the device 102 via one or more mechanical means. For example, in dual-display and/or multi-display panel devices, stand-alone detachable devices may fuse together to become a Converged Mobility Device (CMD), or a dual display device. For example, two or more devices may be attached or "fused" to form a CMD. A CMD can use the processing power of one or more of the attached devices, e.g., to accomplish processing tasks such as computation, trajectory prediction and/or other power intensive tasks. In some embodiments, the devices 102 and 152 may be attached to form a CMD, or a dual display device. The devices 102 and 152 may be attached permanently (e.g., not configured to be detached or separated), or may be removably attached (e.g., the devices 102, 152 may be detached or separated, when desired by a user).

FIG. 2A illustrates a Converged Mobility Device (CMD) 200 comprising the devices 102 and 152 of FIG. 1, according to some embodiments. In some embodiments, the device 102 may be attached via one or more hinges to the device 152. For example, a hinge 201 of the device 102 is illustrated. The hinge 201 may be, for example, a magnetic hinge, a mechanical hinge, or another appropriate type of hinge, which may be attached to a corresponding component of the device 152. For example, the device 102 may be removably attached to the device 152 via the hinge 201.

Thus, in an example, a user may attach the devices 102 and 152, and use the devices 102 and 152 as the CMD 200. In another example, the user may also separate the devices 102 and 152, and may use the device 102 and/or the device 152 separately. Merely as an example, the devices 102, 152 may each act as a display, such that the CMD is a dual display device. Merely as another example, in the CMD 200, the device 152 may act as a virtual keyboard (e.g., a keyboard displayed on a display of the device 152), and the device 102 may act as a display of the CMD 200. Thus, the CMD 200 may act as a laptop, a tablet, a phablet, and/or the like. When used separately, individual ones of the device 102 and/or the device 152 may act as a tablet, a phablet, or the like.

In some embodiments, when attached to form the CMD 200, the port 104 of the device 102 may be attached to the port 154 of the device 152 via a connection through the hinge 201 (e.g., the communication link 190 is via the hinge 201). Thus, for example, the communication link 190 between the ports 104, 154 may not be a standard USB connection link—rather, the connection may be a customized connection (e.g., a customized USB connection) that goes through the hinge 201. In such an example, the port 104 may be a dedicated port for coupling to the device 152 via the hinge (or devices similar to the device 152), but may not be configured to be coupled to a AC adapter.

Although the CMD 200 is illustrated to include two devices 102 and 104, more than two devices may be included in the CMD 200. For example, multiple devices may be cascaded to form a multi-display CMD. In an example, a dual-display CMD may be connected to an external wall adaptor or Type-C adaptor.

Although the devices 102, 152 are illustrated to be coupled to form the CMD 200 in FIG. 2A, in some other embodiments, the devices 102, 152 may be coupled via the port 104, but without the devices 102, 152 being attached to form a CMD. For example, in such examples, the devices 102, 152 may be coupled via standard USB cables (e.g., a USB type C cable, in case one or both the ports 104, 154 are USB type C ports).

FIGS. 2B-2C respectively represent two example positions of the power consumer device 102 with respect to the power provider device 152, when the two devices 102, 152 are arranged as the CMD 200 of FIG. 2A, according to some embodiments. For example, as discussed with respect to FIG. 2A, the device 102 may be coupled to the device 152 via the hinge 201, and the device 102 may be rotated with respect to the device 152 (e.g., direction of the rotation is illustrated using dotted arrows in FIGS. 2B-2C). In FIG. 2B, the device 102 is at a first position relative to the device 152, such that an angle between two devices is a1. In FIG. 2C, the device 102 is at a second position relative to the device 152, such that an angle between two devices is a2. As would be readily appreciated by those skilled in the art, there may be numerous other possible positions of the device 102 relative to the device 152. For example, the device 102 may be rotated by 360° relative to the device 152, to use the CMD device 200 in different modes, such as a tablet, a book, a tent, a laptop, etc.

As would be discussed in further details herein (e.g., with respect to at least FIG. 4), in some embodiments, a change of position of the device 102 relative to the device 152 may trigger a test phase, during which parameters for power transmission between the devices 102, 152 may be updated.

Referring again to FIG. 1, in the example where the ports 104, 154 are appropriate types of USB ports, the communication link 190 may be a USB link, e.g., a USB cable. In another example, the communication link 190 may be via a hinge (e.g., hinge 201), e.g., when the devices 102, 152 are dual display devices or CMDs.

In some embodiments, when power is being transmitted from the device 152 to the device 102, the transmission of power may be based on an impedance (e.g., resistance) of the power transmission medium used for power transfer. For example, the power transmission medium (also referred to as transmission medium) may comprise the port 154, the link 190, the port 104, connections between these components, etc.

With the growing popularity of the USB interfaces (e.g., USB type C interface), the consumer electronic market is flooded with non-compliant chargers and USB cables, which may harm the devices with which they are used. For example, for a USB-C cable (e.g., which may act as the link 190), if the user is not careful and buys any available cable, the rise in temperature in the cable may cause discomfort to the end-user and/or may result in a potentially hazardous situation where the cable may heat up and cause fire at the very worst and may hurt the charging time at the very least. This may occur due to the conductive medium of the cable not being capable of the rated current that the cable advertises to provide. Even capability of a certified cable may degrade over time, e.g., due to aging, contact oxidation, debris build-up, etc.

In the case of a detachable device, when connected to self-powered or passive accessories like power bank or keyboards, the oxidation of the contacts (e.g., pogo-contacts) of the ports (e.g., ports 104, 154) and/or presence of lint or other debris may degrade the capability of the conductive medium of the link 190.

Also, in the scenario of CMDs (e.g., as discussed with respect to FIG. 2A) where the hinge 201 is used for power transmission between the devices 102, 152, the hinge 201 (or at least a part of the hinge 201) between the two devices may suffer oxidation, corrosion, wear and tear, etc. over time. This may result in degradation in the conductivity of the medium between the devices 102, 152, in turn higher power losses, and effectively lesser power being delivered from the device 152 to the device 102. The increase in temperature due to power loss may also cause discomfort to the user, and may result in possible hazardous situation where the hinge may heat up and may even cause fire in extreme situations.

To alleviate the above discussed scenarios, in some embodiments, the device 152 may adaptively control the power delivery, e.g., based on sensing the condition or state of the power transmission medium. For example, the device 152 may comprise a controller 160 comprising an adaptation logic 158. The device 102 may comprise a controller 110 (also referred to as controller 110) including a detection circuitry 108. The controllers 160, 110 may be Power Delivery Controllers (PD controllers), microcontrollers, etc.

FIG. 1 illustrates the device 152 comprising the adaptation logic 158 and the device 102 comprising the detection circuitry 108. However, in another example (and not illustrated in FIG. 1), the location of the adaptation logic 158 and the detection circuitry 108 may be reverse (e.g., the device 102 may comprise the adaptation logic 158 and the device 152 may comprise the detection circuitry 108). In yet another example (and not illustrated in FIG. 1), each of the devices 102, 152 may comprise two respectively instances of the adaptation logic 158; and each of the devices 102, 152 may comprise two respectively instances of the detection circuitry 108.

In operation, during a test phase, the device 152 may request the consumer device 102 to consume a known reference test current through the link 190, at a reference test voltage, and subsequently, the device 152 may transmit the reference current to the consumer device 102. The detection circuitry 108 may measure the received voltage. Assume that the device 152 provides the reference test current at a test voltage 192*a* (e.g., as measured at the device 152), and the detection circuitry 108 measures a test voltage 192*b* of the received reference test current. If the transmission medium (e.g., which comprises the ports 154, 102, and the link 190) has relatively low or nominal resistance (e.g., if the link 190 is a standard USB cable in good condition), then the voltages 192*a* and 192*b* would be substantially similar. On the other hand, if the transmission medium has relatively high resistance (e.g., if the link 190 is in poor condition, the contacts of the ports 104 and/or 154 are rusty or dirty, and/or the like), then the voltage 192*b* would be substantially less than the voltage 192*a* (e.g., higher voltage drop and power loss in the transmission medium).

In some embodiments, based on determining the difference between the voltages 192*a*, 192*b*, the devices 152, 102 may have an idea of the resistance of the transmission medium. In some embodiments and as discussed in further details herein later, the logic 158 may dynamically adapt transmission of power, based on the difference between the voltages 192*a* and 192*b* (or based on an estimated resistance of the transmission medium, where the estimated resistance may be determined based on the difference between the voltages 192*a* and 192*b*).

In some embodiments, the detection circuitry 108 (which can be an analog to digital convertor (ADC)) can measure the voltage 192*b*, and transmit the value of the voltage 192*b* digitally to the device 152 (e.g., the controller 160). The controller 160 may, thus, have values of voltages 192*a* and 192*b*. The controller 160 may determine a difference between the voltages 192*a* and 192*b*, and may also estimate a resistance of the transmission medium based on the difference. Based on the resistance, the device 152 may advertise a modified power providing capability to the device 102. For example, the device 152 may advertise a lower power providing capability to the device 102 (e.g., if the resistance is relatively higher), or the device 152 may advertise a higher power providing capability to the device 102 (e.g., if the resistance is relatively lower).

In some embodiments, the device 102 may also receive information about the resistance of the transmission medium and/or receive information about the difference between the voltages 192*a* and 192*b*. Based on the received information, the device 102 may reduce its power consumption, and/or modify a power request to the device 162 accordingly.

If the link 190 has a resistance beyond a threshold limit, the device 102 may even alert a user of the device 102 about possible fault in the link, or alert about a delay in charging of the device 102, as discussed in further details herein later. In another example, if the resistance of the transmission medium is somewhat higher than a rated resistance, then the device 152 can transmit the rated or negotiated current to the device 102, but at a slightly higher voltage level (e.g., to compensate for the voltage drop in the transmission medium, without compromising on the amount of delivered power). In yet another example, if the resistance of the transmission medium is higher than a rated resistance, then the device 152 may transmit current that is less than a negotiated current to the device 102. In yet another example, the device 152 may undertake another appropriate strategy, based on estimating the resistance of the transmission medium (or based on determining a difference between the voltages 192*a* and 192*b*).

Figure 3:
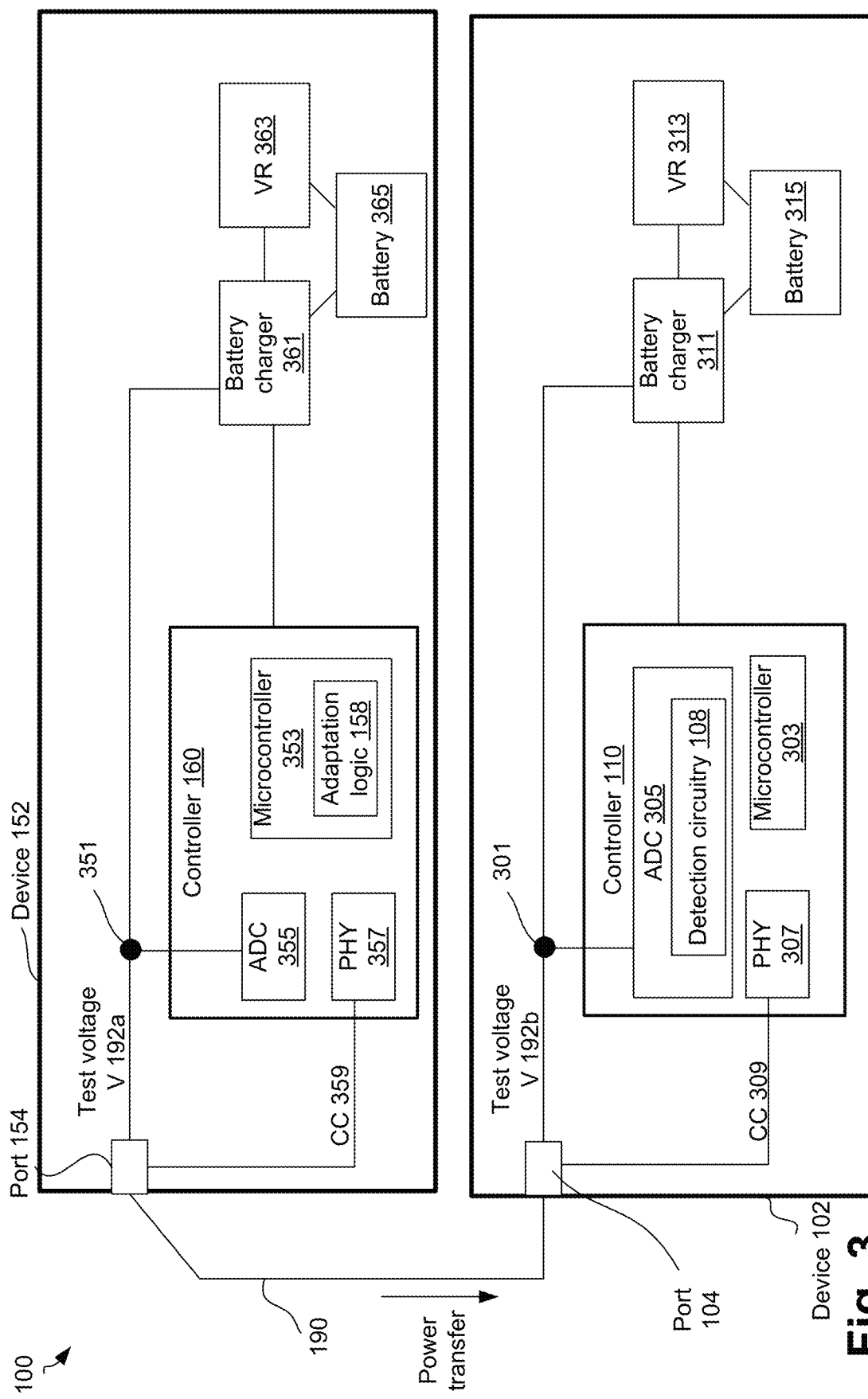
FIG. 3 illustrates an example implementation of the power provider device and the power consumer device of FIG. 1, according to some embodiments.

FIG. 3 illustrates an example implementation of the power provider device 152 and the power consumer device 102 of FIG. 1, according to some embodiments. FIG. 3 illustrates mainly those components of the devices 102, 152 that are associated with power transmission between the two devices. For example, communication paths, components, etc. associated with data communication between the two devices 102, 152 are not fully illustrated in this figure.

In some embodiments, the device 102 may comprise the controller 110, which may include a ADC 305, a Physical Layer (PHY) 307, and a microcontroller 303. In an example, the ADC 305 may be used to implement the detection circuitry 108 (although appropriate another voltage measurement arrangement may also be used). The PHY 307 may communicate with the port 104 via a Configuration Channel (CC) 309. The microcontroller may control one or more operations of the controller 110. In some embodiments, the device 102 may comprise a battery charger 311, a voltage regulator (VR) 313, and a battery 315. The battery charger 311 may be coupled to the port 104 via a node 301.

In some embodiments, the device 152 may comprise the controller 160, which may include a ADC 355, a PHY 357, and a microcontroller 353. In an example, the microcontroller 353 may be used to implement the adaptation logic 158 (although appropriate another adaptation logic may also be used). The PHY 357 may communicate with the port 154 via a CC 359. The microcontroller 353 may control one or more operations of the controller 160. In some embodiments, the device 152 may comprise a battery charger 361, a VR 363, and a battery 365. The battery charger 361 may be coupled to the port 154 via a node 351.

Figure 4:
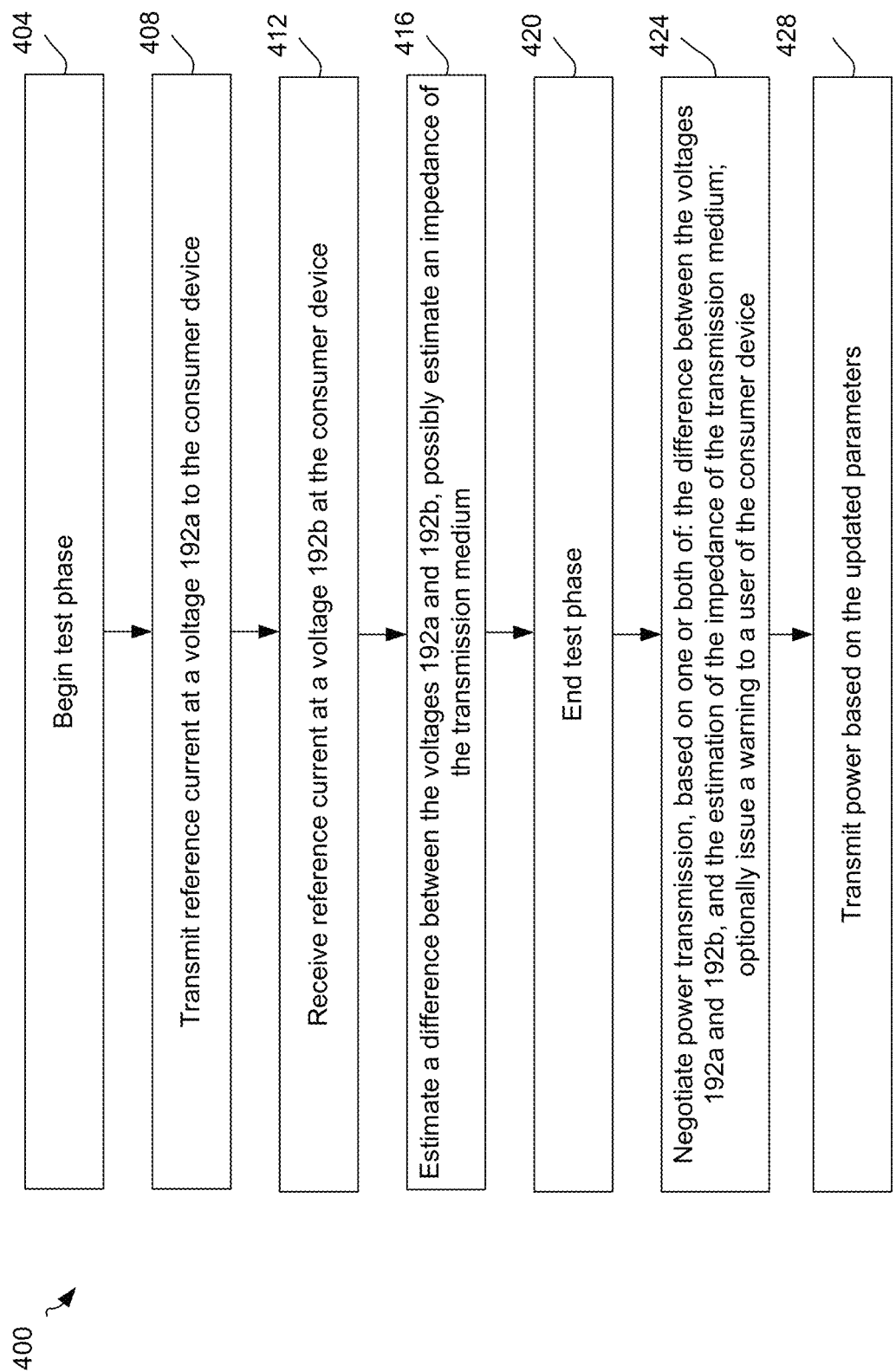
FIG. 4 illustrates a flowchart depicting a method for adaptively controlling power flow from the power provider device to the power consumer device, based on an estimation of a resistance of a transmission medium between the two devices, according to some embodiments.

FIG. 4 illustrates a flowchart depicting a method 400 for adaptively controlling power flow from the power provider device 152 to the power consumer device 102, based on an estimation of a resistance of a transmission medium between the two devices 102, 152, according to some embodiments. Thus, the illustrated embodiments can be performed in a different order, and some actions/blocks may be performed in parallel. Some of the blocks and/or operations listed in FIG. 4 may be optional in accordance with certain embodiments. The numbering of the blocks presented is for the sake of clarity and is not intended to prescribe an order of operations in which the various blocks must occur.

In some embodiments, at 404 of the method 400, a test phase may commence. The test phase may occur at any appropriate time. Some example situations when the test phase occurs may include, for example, whenever the device 102 and 152 are initially coupled or attached via the link 190, whenever the devices 102 and 152 negotiate a power transmission agreement (e.g., in accordance with USB power delivery standards), at the commencement of power transmission from the device 152 to the device 102, at periodic and/or aperiodic intervals, whenever one or both the devices 102, 152 boots up, or wakes up from a low power mode, when the position of the interconnecting cable or any medium changes, and/or at any other appropriate interval.

In some embodiments, the test phase of 303 may also commence whenever there is a change of physical position of the device 102 relative to the device 152, e.g., when the devices 102, 152 are combined to form a CMD. For example, as discussed with respect to FIGS. 2A-2C, in detachable and non-detachable CMD devices, a hinge (e.g., the hinge 201) may be the transmission medium over which power is transferred from the device 152 to the device 102. The power transfer may be implemented using USB type-C Power Delivery scheme, or any other appropriate power delivery scheme. Due to ambient factors (e.g., aging, corrosion, accumulation of debris, etc.), the power transmission medium (e.g., the hinge) may suffer a degradation in conductivity, which may possibly cause higher losses and effectively lesser power delivery. For example, the device 102 may be rotated by 360° relative to the device 152, to use the CMD device 200 in different modes, such as a tablet, a book, a tent, a laptop, etc.

There may be a possibility that the contacts within the hinge 201 experience a different resistance for different relative positions of the device 102 with respect to the device 152, e.g., due to the variation in the oxidation thickness or due to the presence of pocket lint. Thus, for example, the resistance of the power transmission medium between the devices 102, 152 for the position of FIG. 2B may be different from the resistance of the power transmission medium between the devices 102, 152 for the position of FIG. 2C. Accordingly, in some embodiments, the test phase of 404 of the method 400 of FIG. 4 may be performed each time the device 102 is rotated relative to the device 152.

Figure 6:
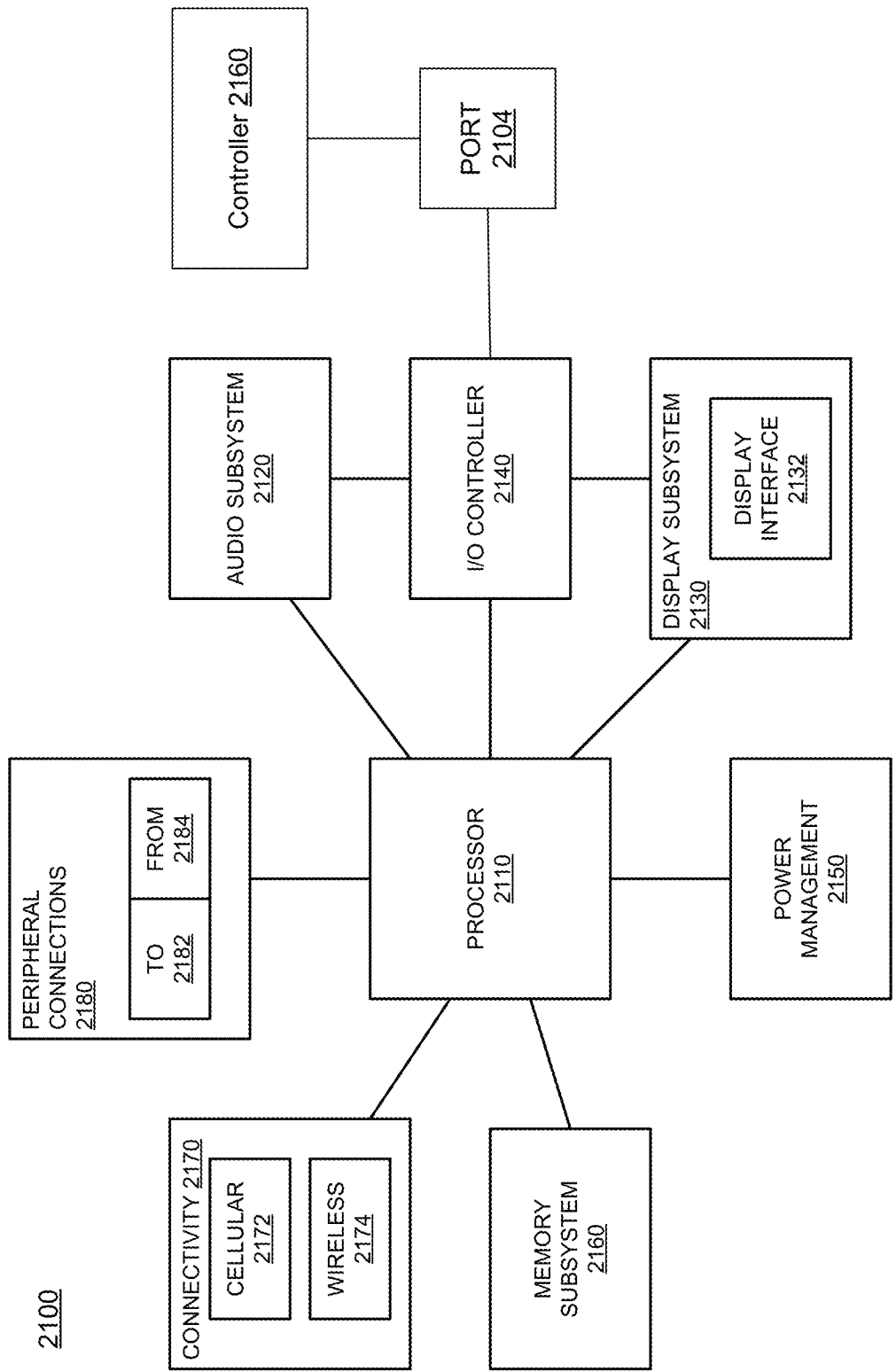
FIG. 6 illustrates a computing device or a SoC (System-on-Chip), where power transmitted between another computing device and the computing device may be adaptively updated based on a resistance of power transmission media between the two devices, according to some embodiments.

Each time the device 102 is rotated relative to the device 152 (or when the device 102 is attached or detached from the device 152), the controllers 160, 110 can be informed of the change of position (e.g., from a processor 2110 of FIG. 6, an I/O or embedded controller 2140 of FIG. 6, and/or the like). In some embodiments, each time the device 102 position changes relative to the device 152 and the device 102 stays in the new position for at least a threshold period of time, the controllers 160 and/or 110 may cause the test phase to begin at 404. Subsequently, re-negotiation of a power contract for transmission of power between the devices may occur (e.g., based on the new resistance estimated during the test phase, after the change of position).

After the beginning of the test phase, the method 400 may move to 408, where the provider device 152 may provide a reference current as requested by the consumer device 102 at voltage 192a to the consumer device 102. Although not illustrated in FIG. 4, such transmission of test current may occur after commencement of negotiations between the device 102 and 152 (e.g., using communication over the CC 309 and 359), and both devices 102, 152 are aware about the impending transmission of the reference current.

At 408, the device 102 may receive the reference current and measure the voltage 192b of the reference current. The voltage may be measured at node 301 using the detection circuitry 108, which may be implemented as a ADC 305 (although other voltage measurement scheme may also be employed). The reference current may be consumed by the battery 315, the VR 313, and/or the battery charger 311.

Ideally, e.g., when the power transmission medium between the devices 102, 152 has negligible resistance, the voltages 192a and 192b may be substantially the same. However, when the power transmission medium between the devices 102, 152 has non-negligible resistance, the voltage 192b may be substantially less than the voltage 192a.

In some embodiments, at 416, a difference between the voltages 192a and 192b may be estimated, and also optionally, a resistance of the transmission medium may be estimated based on the difference.

The operations at 416 may be performed by the device 102 and/or the device 152. In one example, the controller 110 may measure the voltage 192b, and transmit the value of the voltage 192b digitally (e.g., via the CC 309) to the controller 160 of the device 152. Thus, the device 152 (e.g., the microcontroller 353) would have access to the values of both the voltages 192a, 192b, and may determine the difference between the voltages 192a, 192b. Similarly, the device 152 (e.g., the microcontroller 353) may also estimate the resistance of the transmission medium, e.g., based on the difference and the value of the transmitted reference current. In some embodiments, the device 152 may share the values of the voltage difference and/or the resistance of the transmission medium with the controller 110 of the device 102.

In another example and at least in part contrary to the above discussion, the controller 160 may transmit to the controller 110 of the device 102 the value of the voltage 192a (e.g., via the CC 359, 309). Thus, the device 102 (e.g., the microcontroller 303) would have access to the values of both the voltages 192a, 192b, and may determine the difference between the voltages 192a, 192b. Similarly, the device 102 (e.g., the microcontroller 303) may also estimate the resistance of the transmission medium, e.g., based on the difference and a known value of the reference current. In some embodiments, the device 102 may share the values of the voltage difference and/or the resistance of the transmission medium with the controller 160 of the device 152.

Thus, in an example, any one of the devices 102, 152 may determine the difference between the voltages 192a, 192b, and share the value of the difference with another of the devices 102, 152. In some embodiments, then, any of the devices 102, 152 may estimate the resistance of the transmission medium, e.g., based on the difference.

At 420, the test phase ends. At 424, transmission of power is negotiated between the devices 102, 152 (e.g., between controllers 110, 160), based at least in part on one or both: the difference between the voltages 192a and 192b, or the estimation of the resistance of the transmission medium. Several other factors may also be considered when performing the power negotiations, such as power requested by the consumer device 102, power providing capacity of the power provider device 152, charge levels (e.g., relative State of Charge) of the batteries 361, 311, types of the devices 102, 152, advertised power transmission rating of the link 190, etc.

For example, if the difference between the voltages 192a and 192b is negligible, and/or the estimation of the resistance of the transmission medium is negligible (e.g., the link 190 is in good condition), then relatively more power (e.g., higher voltage and/or higher current) may be safely transmitted over the transmission medium from the device 152 to the device 102. On the other hand, if the difference between the voltages 192a and 192b is non-negligible, and/or the estimation of the resistance of the transmission medium is non-negligible (e.g., the link 190 is in relatively poor condition), then relatively less power (e.g., lower voltage and/or lower current) may be safely transmitted over the transmission medium from the device 152 to the device 102.

In some embodiments, if the difference between the voltages 192a and 192b is non-negligible, and/or the estimation of the resistance of the transmission medium is non-negligible (e.g., the link 190 is in relatively poor condition), then the voltage rated for the link 190, but with current less than the rated current of the link 190, may be transmitted from the device 152 to the device 102. In another example, for such a situation, the voltage of the power transmission may also be reduced. In another example, if the resistance of the transmission medium is somewhat higher than a rated resistance, then the device 152 can transmit the rated or negotiated current to the device 102, but at a slightly higher voltage level (e.g., to compensate for the voltage drop in the transmission medium, without compromising on an amount of delivered power).

Figure 5:
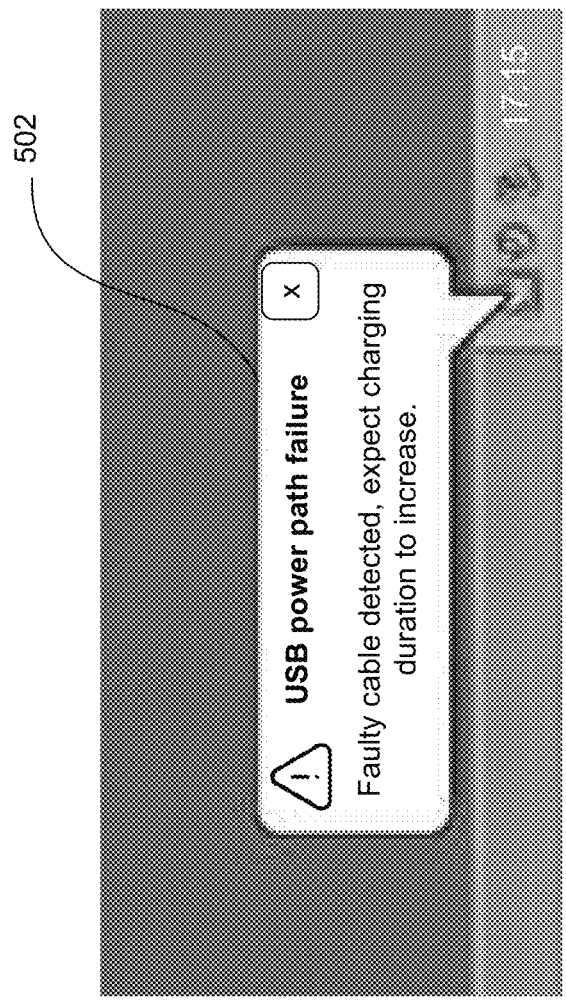
FIG. 5 illustrates an example notification to warn a user of a power consumer device of possible issues related to power transmission, according to some embodiments.

Also, at 424, optionally, a warning notification may be issued to a user of the consumer device 102, e.g., if the difference in voltages 192a, 192b is higher than a threshold value. FIG. 5 illustrates an example notification 502 to warn a user of the power consumer device 102 of possible issues related to power transmission, according to some embodiments. For example, the notification 502 may pop-up on a display screen 500 of the device 102, which may warn the user the following: "USB power path failure—Faulty cable detected, expect charging duration to increase." The warning may be issued based on one or more of: detecting a substantial difference between the voltages 192a, 192b, estimating a high resistance of the transmission medium, and/or negotiating a relatively low power contract (e.g., to transmit relatively low power), as a result of which the charging time to charge the battery 315 using power from the device 152 may increase.

The language of the notification 502 is merely an example, and any other appropriate language may be used. For example, the notification 502 may warn the following: "USB power path failure—Faulty cable detected, expect charging duration to increase—change the USB cable to decrease the charging time." In another example, the notification 502 may warn the following: "USB power path failure—Faulty cable detected—change the USB cable to commence charging—device not currently being charged."

Various embodiments discussed herein with respect to FIGS. 1-5 assume that the test phase for detecting the difference between the voltages 192*a*, 192*b* and estimating the transmission medium resistance is for the power line of the link 190 (e.g., for the line for transmitting power between the two devices). In some embodiments, similar principles may also be applied for detecting state of transmission medium of one or more lines of the link 190 that are to be used for data communication.

For example, one of the devices 102, 152 may transmit data using a known first voltage to another of the devices 102, 152, over a data communication line (which is generally different from the line used for power transmission). Another of the devices may detect a second voltage, where a difference between the first and second voltages may be an indication of the resistance of the data communication line of the link 190. In some embodiments, based on the difference between the voltages and/or an estimation of the resistance of the data communication line of the link 190, the devices 102, 152 may adjust data communication speed, adjust a voltage level used for data communication, etc.

FIG. 6 illustrates a computing device or a SoC (System-on-Chip) 2100, where power transmitted between another computing device and the computing device 2100 may be adaptively updated based on a resistance of power transmission media between the two devices, according to some embodiments. It is pointed out that those elements of FIG. 6 having the same reference numbers (or names) as the elements of any other figure can operate or function in any manner similar to that described, but are not limited to such.

In some embodiments, computing device 2100 represents an appropriate computing device, such as a computing tablet, a mobile phone or smart-phone, a laptop, a desktop, an IOT device, a server, a set-top box, a wireless-enabled e-reader, or the like. It will be understood that certain components are shown generally, and not all components of such a device are shown in computing device 2100.

In some embodiments, computing device 2100 includes a first processor 2110. The various embodiments of the present disclosure may also comprise a network interface within 2170 such as a wireless interface so that a system embodiment may be incorporated into a wireless device, for example, cell phone or personal digital assistant.

In one embodiment, processor 2110 can include one or more physical devices, such as microprocessors, application processors, microcontrollers, programmable logic devices, or other processing means. The processing operations performed by processor 2110 include the execution of an operating platform or operating system on which applications and/or device functions are executed. The processing operations include operations related to I/O with a human user or with other devices, operations related to power management, and/or operations related to connecting the computing device 2100 to another device. The processing operations may also include operations related to audio I/O and/or display I/O.

In one embodiment, computing device 2100 includes audio subsystem 2120, which represents hardware (e.g., audio hardware and audio circuits) and software (e.g., drivers, codecs) components associated with providing audio functions to the computing device. Audio functions can include speaker and/or headphone output, as well as microphone input. Devices for such functions can be integrated into computing device 2100, or connected to the computing device 2100. In one embodiment, a user interacts with the computing device 2100 by providing audio commands that are received and processed by processor 2110.

Display subsystem 2130 represents hardware (e.g., display devices) and software (e.g., drivers) components that provide a visual and/or tactile display for a user to interact with the computing device 2100. Display subsystem 2130 includes display interface 2132, which includes the particular screen or hardware device used to provide a display to a user. In one embodiment, display interface 2132 includes logic separate from processor 2110 to perform at least some processing related to the display. In one embodiment, display subsystem 2130 includes a touch screen (or touch pad) device that provides both output and input to a user.

I/O controller 2140 represents hardware devices and software components related to interaction with a user. I/O controller 2140 is operable to manage hardware that is part of audio subsystem 2120 and/or display subsystem 2130. Additionally, I/O controller 2140 illustrates a connection point for additional devices that connect to computing device 2100 through which a user might interact with the system. For example, devices that can be attached to the computing device 2100 might include microphone devices, speaker or stereo systems, video systems or other display devices, keyboard or keypad devices, or other I/O devices for use with specific applications such as card readers or other devices.

As mentioned above, I/O controller 2140 can interact with audio subsystem 2120 and/or display subsystem 2130. For example, input through a microphone or other audio device can provide input or commands for one or more applications or functions of the computing device 2100. Additionally, audio output can be provided instead of, or in addition to display output. In another example, if display subsystem 2130 includes a touch screen, the display device also acts as an input device, which can be at least partially managed by I/O controller 2140. There can also be additional buttons or switches on the computing device 2100 to provide I/O functions managed by I/O controller 2140.

In one embodiment, I/O controller 2140 manages devices such as accelerometers, cameras, light sensors or other environmental sensors, or other hardware that can be included in the computing device 2100. The input can be part of direct user interaction, as well as providing environmental input to the system to influence its operations (such as filtering for noise, adjusting displays for brightness detection, applying a flash for a camera, or other features).

In one embodiment, computing device 2100 includes power management 2150 that manages battery power usage, charging of the battery, and features related to power saving operation. Memory subsystem 2160 includes memory devices for storing information in computing device 2100. Memory can include nonvolatile (state does not change if power to the memory device is interrupted) and/or volatile (state is indeterminate if power to the memory device is interrupted) memory devices. Memory subsystem 2160 can store application data, user data, music, photos, documents, or other data, as well as system data (whether long-term or temporary) related to the execution of the applications and functions of the computing device 2100. In one embodiment, computing device 2100 includes a clock generation subsystem 2152 to generate a clock signal.

Elements of embodiments are also provided as a machine-readable medium (e.g., memory 2160) for storing the computer-executable instructions (e.g., instructions to implement any other processes discussed herein). The machine-readable medium (e.g., memory 2160) may include, but is not limited to, flash memory, optical disks, CD-ROMs, DVD ROMs, RAMs, EPROMs, EEPROMs, magnetic or optical cards, phase change memory (PCM), or other types of machine-readable media suitable for storing electronic or computer-executable instructions. For example, embodiments of the disclosure may be downloaded as a computer program (e.g., BIOS) which may be transferred from a remote computer (e.g., a server) to a requesting computer (e.g., a client) by way of data signals via a communication link (e.g., a modem or network connection).

Connectivity 2170 includes hardware devices (e.g., wireless and/or wired connectors and communication hardware) and software components (e.g., drivers, protocol stacks) to enable the computing device 2100 to communicate with external devices. The computing device 2100 could be separate devices, such as other computing devices, wireless access points or base stations, as well as peripherals such as headsets, printers, or other devices.

Connectivity 2170 can include multiple different types of connectivity. To generalize, the computing device 2100 is illustrated with cellular connectivity 2172 and wireless connectivity 2174. Cellular connectivity 2172 refers generally to cellular network connectivity provided by wireless carriers, such as provided via GSM (global system for mobile communications) or variations or derivatives, CDMA (code division multiple access) or variations or derivatives, TDM (time division multiplexing) or variations or derivatives, or other cellular service standards. Wireless connectivity (or wireless interface) 2174 refers to wireless connectivity that is not cellular, and can include personal area networks (such as Bluetooth, Near Field, etc.), local area networks (such as Wi-Fi), and/or wide area networks (such as WiMax), or other wireless communication.

Peripheral connections 2180 include hardware interfaces and connectors, as well as software components (e.g., drivers, protocol stacks) to make peripheral connections. It will be understood that the computing device 2100 could both be a peripheral device ("to" 2182) to other computing devices, as well as have peripheral devices ("from" 2184) connected to it. The computing device 2100 commonly has a "docking" connector to connect to other computing devices for purposes such as managing (e.g., downloading and/or uploading, changing, synchronizing) content on computing device 2100. Additionally, a docking connector can allow computing device 2100 to connect to certain peripherals that allow the computing device 2100 to control content output, for example, to audiovisual or other systems.

In addition to a proprietary docking connector or other proprietary connection hardware, the computing device 2100 can make peripheral connections 2180 via common or standards-based connectors. Common types can include a Universal Serial Bus (USB) connector (which can include any of a number of different hardware interfaces), DisplayPort including MiniDisplayPort (MDP), High Definition Multimedia Interface (HDMI), Firewire, or other types.

The computing device 2100 can be used as any one of the devices 102, 152 of FIGS. 1-5. For example, the computing device 2100 may comprise an I/O port 2104, which can be one of the I/O ports 104, 154 (e.g., depending on which of the devices 102, 152 is being implemented using the computing device 2100). The computing device 2100 may also comprise a controller 2160, which can be one of the controllers 160 or 110 (e.g., depending on which of the devices 102, 152 is being implemented using the computing device 2100). Power transfer between the computing device 2100 and another computing device may be adaptively updated based on a resistance of power transmission media between the two devices, as discussed with respect to FIGS. 1-5.

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. If the specification states a component, feature, structure, or characteristic "may," "might," or "could" be included, that particular component, feature, structure, or characteristic is not required to be included. If the specification or claim refers to "a" or "an" element, that does not mean there is only one of the elements. If the specification or claims refer to "an additional" element, that does not preclude there being more than one of the additional element.

Furthermore, the particular features, structures, functions, or characteristics may be combined in any suitable manner in one or more embodiments. For example, a first embodiment may be combined with a second embodiment anywhere the particular features, structures, functions, or characteristics associated with the two embodiments are not mutually exclusive.

While the disclosure has been described in conjunction with specific embodiments thereof, many alternatives, modifications and variations of such embodiments will be apparent to those of ordinary skill in the art in light of the foregoing description. The embodiments of the disclosure are intended to embrace all such alternatives, modifications, and variations as to fall within the broad scope of the appended claims.

In addition, well known power/ground connections to integrated circuit (IC) chips and other components may or may not be shown within the presented figures, for simplicity of illustration and discussion, and so as not to obscure the disclosure. Further, arrangements may be shown in block diagram form in order to avoid obscuring the disclosure, and also in view of the fact that specifics with respect to implementation of such block diagram arrangements are highly dependent upon the platform within which the present disclosure is to be implemented (i.e., such specifics should be well within purview of one skilled in the art). Where specific details (e.g., circuits) are set forth in order to describe example embodiments of the disclosure, it should be apparent to one skilled in the art that the disclosure can be practiced without, or with variation of, these specific details. The description is thus to be regarded as illustrative instead of limiting.

An abstract is provided that will allow the reader to ascertain the nature and gist of the technical disclosure. The abstract is submitted with the understanding that it will not be used to limit the scope or meaning of the claims. The following claims are hereby incorporated into the detailed description, with each claim standing on its own as a separate embodiment.

We claim:

1. A first apparatus comprising:
    a detection circuitry to detect a first voltage level of reference current received from a second apparatus, wherein the second apparatus is to provide the reference current at a second voltage level; and
    a controller to negotiate a power transmission agreement with the second apparatus for transmission of power from the second apparatus to the first apparatus, based at least in part on a difference between the first voltage level and the second voltage level; wherein:

the controller is to negotiate transmission of a first amount of power, in response to a first difference between the first voltage level and the second voltage level;

the controller is to negotiate transmission of a second amount of power, in response to a second difference between the first voltage level and the second voltage level; and the first amount of power is lower than the second amount of power, in response to the first difference being higher than the second difference.

2. The first apparatus of claim 1, wherein the controller is to cause transmission of a value of the first voltage level to the second apparatus, to cause the second apparatus to determine the difference between the first voltage level and the second voltage level.

3. The first apparatus of claim 2, wherein the second apparatus is to estimate a resistance of a transmission medium used for power transmission from the second apparatus to the first apparatus, based at least in part on the difference between the first voltage level and the second voltage level.

4. The first apparatus of claim 1, wherein:

the controller is to negotiate the power transmission agreement, based at least in part on an estimation of a resistance of a transmission medium used for power transmission from the second apparatus to the first apparatus; and the estimation of the resistance of the transmission medium is based on the difference between the first voltage level and the second voltage level.

5. The first apparatus of claim 1, further comprising:
a first input/output (I/O) port,
wherein a second I/O port of the second apparatus is to be coupled to the first I/O port of the first apparatus via a communication link.

6. The first apparatus of claim 5, wherein the first and second I/O ports are Universal Serial Bus (USB) ports.

7. The first apparatus of claim 6, wherein at least one of the first and second I/O ports is a USB type C port.

8. The first apparatus of claim 1, further comprising:
a hinge to couple the first apparatus to the second apparatus, wherein the first apparatus and the second apparatus are to form a Converged Mobility Device (CMD).

9. The first apparatus of claim 8, wherein the second apparatus is to transmit the reference current, in response to:
a movement of the first apparatus relatively to the second apparatus by an angle in the CMD from a first position to a second position; and
the first apparatus remaining in the second position for at least a threshold period of time.

10. The first apparatus of claim 1, further comprising:
a display,
wherein the controller is to cause issuance of a notification on the display, in response to the difference between the first voltage level and the second voltage level being higher than a threshold amount.

11. A first system comprising:
a memory to store instructions;
a processor circuitry coupled to the memory, the processor circuitry to execute the instructions;
an Input/Output (I/O) port to couple the first system to a second system, and to allow the processor circuitry to communicate with the second system via the I/O port;
an Analog-to-Digital Converter (ADC) to detect a first voltage level of a reference current received from the second system, wherein the second system is to transmit the reference current at a second voltage level; and
a wireless interface to allow the processor to communicate with another system,
wherein the processor circuitry is to cause transmission of a value of the first voltage level to the second system, to allow the second system to transmit power to the first system, wherein a level of the power transmitted from the second system to the first system is based at least in part on a difference between the first voltage level and the second voltage level, wherein the processor circuitry is to negotiate transmission of a first amount of power, in response to a first difference between the first voltage level and the second voltage level, wherein the processor circuitry is to negotiate transmission of a second amount of power, in response to a second difference between the first voltage level and the second voltage level, and wherein the first amount of power is lower than the second amount of power, in response to the first difference being higher than the second difference.

12. The first system of claim 11, further comprising:
a hinge to couple the first system to the second system, wherein the first system and the second system are to form a Converged Mobility Device (CMD).

13. The first system of claim 12, wherein the I/O port is to couple the first system to the second system via the hinge.

14. The first system of claim 11, wherein the I/O port is to couple the first system to the second system via a Universal Serial Bus (USB) cable.

15. The first system of claim 11, further comprising:
a display,
wherein the processor is to cause issuance of a notification on the display, in response to the difference between the first voltage level and the second voltage level being higher than a threshold amount.

16. One or more non-transitory computer-readable storage media to store instructions that, when executed by a processor, cause the processor to:
transmit a reference current at a first voltage from a first apparatus to a second apparatus, wherein the processor and the computer-readable storage media are included in the first apparatus;
receive, from the second apparatus, a value of a second voltage at which the reference current was received at the second apparatus;
determine a difference between the first voltage and the second voltage; and
transmit power from the first apparatus to the second apparatus, based on least in part on the difference between the first voltage and the second voltage;
negotiate transmission of a first amount of power, in response to a first difference between the first voltage level and the second voltage level; and
negotiate transmission of a second amount of power, in response to a second difference between the first voltage level and the second voltage level, wherein the first amount of power is lower than the second amount of power, in response to the first difference being higher than the second difference.

17. The non-transitory computer-readable storage media of claim 16, wherein the instructions cause the processor to:
estimate a resistance of a transmission medium used for power transmission from the first apparatus to the second apparatus, based at least in part on the difference between the first voltage level and the second voltage level, wherein the transmission of power from the first apparatus to the second apparatus is based least in part on the estimation of the resistance of the transmission medium.

18. The non-transitory computer-readable storage media of claim 16, wherein to transmit the reference current, the instructions cause the processor to:
    detect one or more of: a rotation of the first apparatus relative to the second apparatus, a coupling of the first apparatus to the second apparatus, a request for power from the second apparatus to the first apparatus, a booting of one or both the first apparatus or the second apparatus, or a commencement of negotiation for power transfer from the first apparatus to the second apparatus; and
    transmit the reference current, in response to the detection.

19. The non-transitory computer-readable storage media of claim 16, wherein to transmit the reference current, the instructions cause the processor to:
    determine a current level and a voltage level of the power to be transmitted from the first apparatus to the second apparatus, based on least in part on the difference between the first voltage and the second voltage.

\* \* \* \* \*